(12) United States Patent
Lee et al.

(10) Patent No.: US 12,720,373 B2
(45) Date of Patent: Aug. 25, 2026

(54) TECHNIQUES FOR SUPPORTING USER PLANE INTEGRITY PROTECTION IN WIRELESS COMMUNICATIONS

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/394,007

(22) Filed: Aug. 4, 2021

(65) Prior Publication Data

US 2022/0046489 A1 Feb. 10, 2022

Related U.S. Application Data

(60) Provisional application No. 63/061,680, filed on Aug. 5, 2020.

(51) Int. Cl.

| | |
|---|---|
| ***H04W 36/00*** | (2009.01) |
| ***H04W 8/24*** | (2009.01) |
| ***H04W 12/106*** | (2021.01) |

(52) U.S. Cl.
CPC ......... *H04W 36/0038* (2013.01); *H04W 8/24* (2013.01); *H04W 12/106* (2021.01); *H04W 36/008357* (2023.05); *H04W 36/00222* (2023.05)

(58) Field of Classification Search
CPC ....... H04W 36/0038; H04W 36/00835; H04W 12/033; H04W 8/24; H04W 12/10; H04W 12/106; H04W 36/0022; H04W 36/00; H04W 36/0016; H04W 36/001; H04L 63/123
See application file for complete search history.

(56) References Cited

U.S. PATENT DOCUMENTS

| | | | | |
|---|---|---|---|---|
| 2019/0191348 | A1* | 6/2019 | Futaki | H04W 36/0033 |
| 2019/0394651 | A1* | 12/2019 | Wifvesson | H04W 28/18 |
| 2021/0153012 | A1* | 5/2021 | Sharma | H04W 12/10 |
| 2022/0191687 | A1* | 6/2022 | Wifvesson | H04L 63/123 |

* cited by examiner

*Primary Examiner* — Quoc Thai N Vu
(74) *Attorney, Agent, or Firm* — ArentFox Schiff, LLP

(57) ABSTRACT

Aspects described herein relate to initiating, by a source base station, handover of a user equipment (UE) from the source base station to a target base station, where the source base station supports user plane (UP) integrity protection (IP) for the UE, determining, based on initiating the handover, whether the target base station supports the UP IP, and determining, based on determining whether the target base station supports the UP IP, whether to continue the handover of the UE from the source base station to the target base station.

24 Claims, 8 Drawing Sheets

TECHNIQUES FOR SUPPORTING USER PLANE INTEGRITY PROTECTION IN WIRELESS COMMUNICATIONS

CLAIM OF PRIORITY UNDER 35 U.S.C. § 119

The present Application for Patent claims priority to Provisional Patent Application No. 63/061,680, entitled "TECHNIQUES FOR SUPPORTING USER PLANE INTEGRITY PROTECTION IN WIRELESS COMMUNICATIONS" filed Aug. 5, 2020, which is assigned to the assignee hereof and hereby expressly incorporated by reference herein for all purposes.

BACKGROUND

Aspects of the present disclosure relate generally to wireless communication systems, and more particularly, to user plane (UP) integrity protection (IP).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In 5G NR, UP IP is supported for a user equipment (UE) connected to a 5G core network in standalone mode. The UE can specify a security capability to the 5G core network to indicate whether UP IP is supported by the UE, and the UE can use UP IP in communicating with the 5G core network in non-access stratum (NAS) signaling and/or in communicating with the base station using access stratum (AS) signaling.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect an apparatus for wireless communication is provided that includes a transceiver, a memory configured to store instructions, and one or more processors communicatively coupled with the memory and the transceiver. The one or more processors are configured to execute the instructions to cause the apparatus to initiate, by a source base station, handover of a user equipment (UE) from the source base station to a target base station, wherein the source base station supports user plane (UP) integrity protection (IP) for the UE, where the target base station supports the UP IP, transmit, to the UE, a radio resource control (RRC) reconfiguration message to cause the UE to handover communications to the target base station, and where the target base station does not support the UP IP, refrain from transmitting, to the UE, the RRC reconfiguration message to cause the UE to handover communications to the target base station.

According to another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive, by a target base station, an indication to handover a UE from a source base station to the target base station, indicate, to the source base station, that the target base station supports UP IP, and receive handover of the UE from the source base station.

According to another aspect, a method for wireless communication is provided that includes initiating, by a source base station, handover of a UE from the source base station to a target base station, wherein the source base station supports UP IP for the UE, where the target base station supports the UP IP, transmitting, to the UE, a RRC reconfiguration message to cause the UE to handover communications to the target base station, and where the target base station does not support the UP IP, refraining from transmitting, to the UE, the RRC reconfiguration message to cause the UE to handover communications to the target base station.

In another aspect, a method for wireless communication is provided that includes receiving, by a target base station, an indication to handover a UE from a source base station to the target base station, indicating, to the source base station, that the target base station supports UP IP, and receiving handover of the UE from the source base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
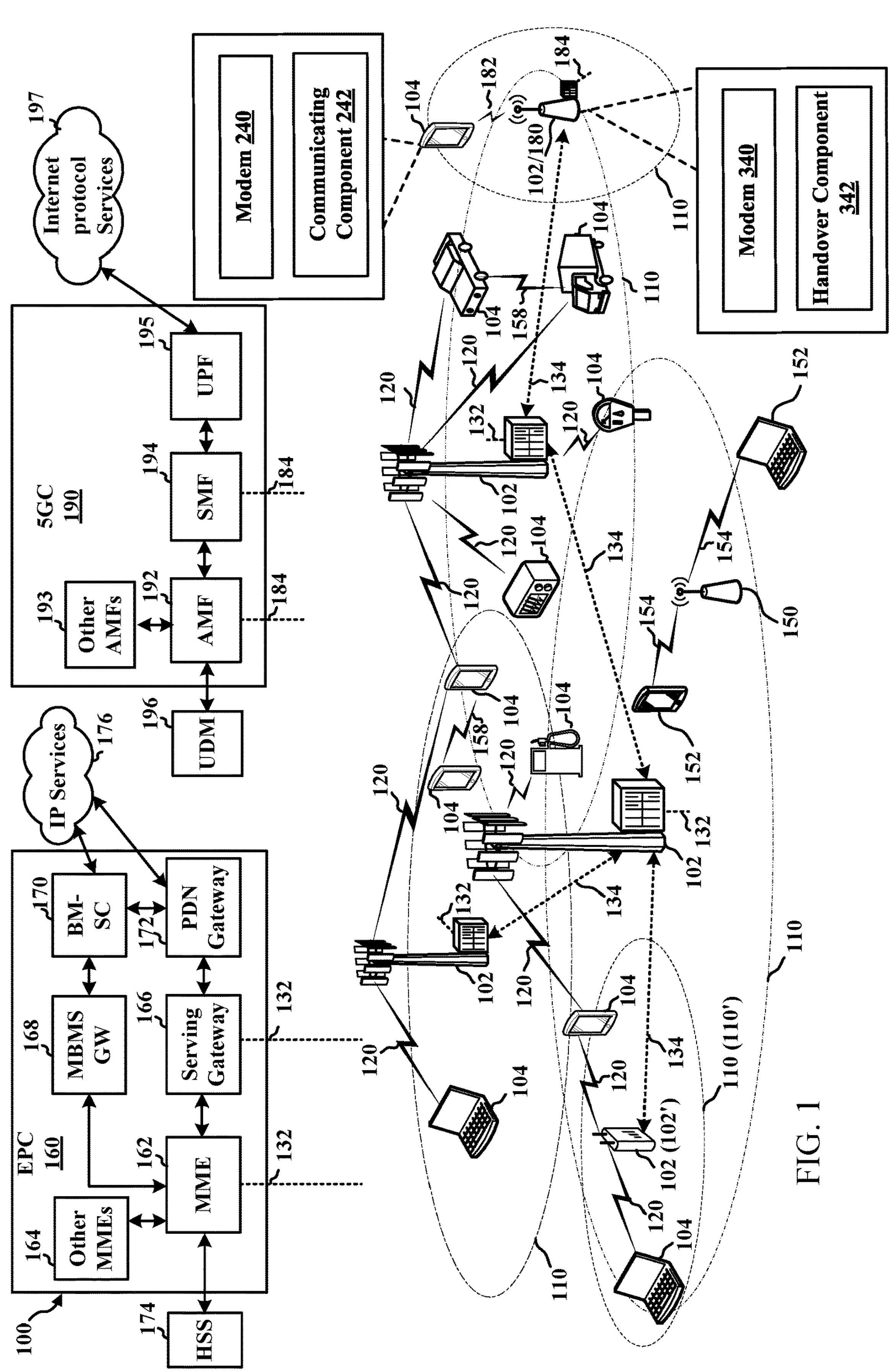
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting user plane (UP) integrity protection (IP) for a user equipment (UE), to protect data exchanged between UE and a base station over the UP (e.g., over a data radio bearer (DRB)). For example, currently in long term evolution (LTE), DRB is only ciphered without integrity protection. In accordance with aspects described herein, UP IP can be supported in additional modes, other than the UE communicating with a base station using fifth generation (5G) new radio (NR) radio access technology (RAT) to access a 5G system. In examples described herein, UP IP can be supported for a UE in various scenarios of communicating with a base station using one or more of 5G NR RAT or Evolved Universal Mobile Telecommunications System (UMTS) Terrestrial Radio Access (eUTRA) RAT to communicate with one or more of a 5G core (5GC) or evolved packet core (EPC) network. In addition, handover between base stations having one or more of the various configurations of RAT and core network can be supported. In addition, support of UP IP for other RAT/core network combinations and handover therebetween can be supported.

UP IP or DRB IP (Data Radio Bearer IP) support was introduced in Rel-15 5G System for NR. 5G NR can be connected to 5GC (5G system (5GS)) or EPC (evolved packet system (EPS)) using option 3 (EPC based Dual Connectivity of eUTRA and NR RAT) or EN-DC (eUTRA and NR dual connectivity). However, UP IP was only supported when 5G NR is connected to 5G core network (5GC) (in standalone mode or option 2), which can include NR-NR Dual Connectivity (NR-DC). UP IP may possibly be supported in the following RAN options (e.g., when at least one RAN node includes LTE or eUTRA): Option 1—eUTRA with EPC; Option 3—EPC based Dual Connectivity of eUTRA and NR RAT; Option 4—5G core based Dual Connectivity (NR master—eUTRA secondary); Option 5—5G core with eUTRA; or Option 7—5G core based Dual Connectivity (eUTRA master—NR secondary).

In 5G, a UE can signal support of UP IP over NR to the 5GC network using UE security capability information element (IE) during UE registration to 5G system (e.g., as specified in third generation partnership project (3GPP) technical specification (TS) 24.501, section 9.11.3.54). In the security capability IE, supported NR integrity protection algorithms for NR can be in octet 4 and integrity protection algorithms for eUTRA can be in octet 6. A UE can indicate EPS UE Security Capability to the network using a separate IE in 5GS (known as S1 UE Security Capability in 5GS), and the UE can use the same IE when the UE registers to EPS (4G) (e.g., as defined in 3GPP TS 24.301 section 9.9.3.36). UP IP is currently not supported in EPS, but examples described herein relate to indicating support for UP IP for EPS in some examples. A separate indication of UP IP support over eUTRA to the network may be desired. The indication may be indicated when the UE starts supporting UP IP over eUTRA. UE vendors can have flexibility in deciding when to enable it independent of UP IP support over NR, e.g., due to the need to interoperability test under various RAN network deployment scenarios. It may not be feasible to test under all possible deployment scenarios as some options may be deployed later than others.

To support UP IP over eUTRA when connecting to 5GC, for example, one of the unused EEA or EIA bits in 5G UE security capability can be used to indicate that the UE supports UP IP in eUTRA. For example, the same bit may also be used to indicate that the UE supports the same maximum data rate capability for UP IP over eUTRA (in the same way as for NR). In other examples, UE capability based negotiation can be provided where the UE separately indicates to the network a maximum supported data rate for integrity protection (e.g., as specified in 3GPP TS 24.501 section 9.11.4.7 as a 5GS session management (5GSM) IE). To support UP IP over eUTRA when connecting to EPC, one of the unused EEA or EIA bits in 4G (S1) UE security capability can be used to indicate that the UE supports UP IP over eUTRA. In one example, the UE can use the same unused bit to also indicate UP IP support over NR or can use a different unused bit to indicate UP IP support over NR. In the latter example, two spare bits from 4G (S1) UE security capability can be used.

Based on the above, support for UP IP may be indicated and/or supported in various RAT/core network combinations (e.g., Options 1, 3, 4, 5, 7 listed above). Aspects described herein relate to determining support for UP IP for a target base station (and/or underlying core network) during handover. For example, in handover from NR connected to 5GC to eUTRA, source base station can benefit from knowing the target eUTRA base station's UP IP capability to determine handover. In an example, protocol data unit (PDU) sessions that require UP IP may not be transferred to target eUTRA base station. Otherwise, handover may result in unexpected service disruption and/or security issue (e.g., handover to target eUTRA base station may result in turning off (or deactivating) UP IP for all DRBs at the target).

In aspects described herein, the target base station can indicate support of UP IP as part of handover for a UE to the target base station. The target base station can indicate support of UP IP to a source base station directly, or to core network entities for indicating to the source base station based on deployment. For example, the target base station can indicate support of UP IP in a transparent target to source container, in a handover request acknowledgement or other handover message, etc. For example, the transparent target to source container can include a generic message transmitted over a backhaul link between the target and source base stations. In one example, the transparent target to source container can traverse the core networks between the target and source base stations to facilitate communications therebetween. In an example, the transparent target to source container can be used to carry the RRC Connection Reconfiguration message that is used for handover signaling and may otherwise be sent to the UE via the source base station. The source base station can determine whether to continue handover of the UE to the target base station based on whether UP IP support is indicated by or for the target base station. This can allow for supporting UP IP in handover among various combinations of RAT and core network, which can improve UE mobility and increase coverage area for the UE, as well as provide increased security by supporting UP IP in more scenarios.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with one or more base stations 102 and/or gNBs 180 and/or core networks (e.g., EPC 160/5GC 190), in accordance with aspects described herein. In addition, some nodes may have a modem 340 and handover component 342 for indicating UP IP support and/or for determining whether UP IP is supported for handing over a UE 104, in accordance with aspects described herein. Though a UE 104 is shown as having the modem 240 and communicating component 242 and a base station 102/gNB 180 is shown as having the modem 340 and handover component 342, this is one illustrative example, and substantially any node or type of node may include a modem 240 and communicating component 242 and/or a modem 340 and handover component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG- RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol packets are transferred through the Serving Gateway 166, which itself is connected to the PDN Gateway 172. The PDN Gateway 172 provides UE Internet protocol address allocation as well as other functions. The PDN Gateway 172 and the BM-SC 170 are connected to the Internet protocol Services 176. The Internet protocol Services 176 may include the Internet, an intranet, an Internet protocol Multimedia Subsystem (IMS), a PS Streaming Service, and/or other Internet protocol services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF

192 can be a control node that processes the signaling between the UEs 104 and the 5GC 190. Generally, the AMF 192 can provide QoS flow and session management. User Internet protocol packets (e.g., from one or more UEs 104) can be transferred through the UPF 195. The UPF 195 can provide UE Internet protocol address allocation for one or more UEs, as well as other functions. The UPF 195 is connected to the Internet protocol Services 197. The Internet protocol Services 197 may include the Internet, an intranet, an Internet protocol Multimedia Subsystem (IMS), a PS Streaming Service, and/or other Internet protocol services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a source base station 102 or gNB 180 can support UP IP with a UE 104, and handover component 342 of the source base station 102 or gNB 180 can determine whether a target base station 102 or gNB 180 supports UP IP. Handover component 342 of the source base station 102 or gNB 180 can determine whether the handover the UE 104 to the target base station 102 or gNB 180 based on whether or not the target base station 102 or gNB 180 supports UP IP. Handover component 342 of a target base station 102 or gNB 180 can indicate (e.g., to the source base station 102 or gNB 180) whether it supports UP IP. This can enable handover among various combinations of RAT and core network at a base station 102 or gNB 180, as described. For example, the source base station 102 or gNB 180 and target base station 102 or gNB 180 can support different RATs and/or may be connected to different core networks (e.g., EPC 160 or 5GC 190).

Figure 2:
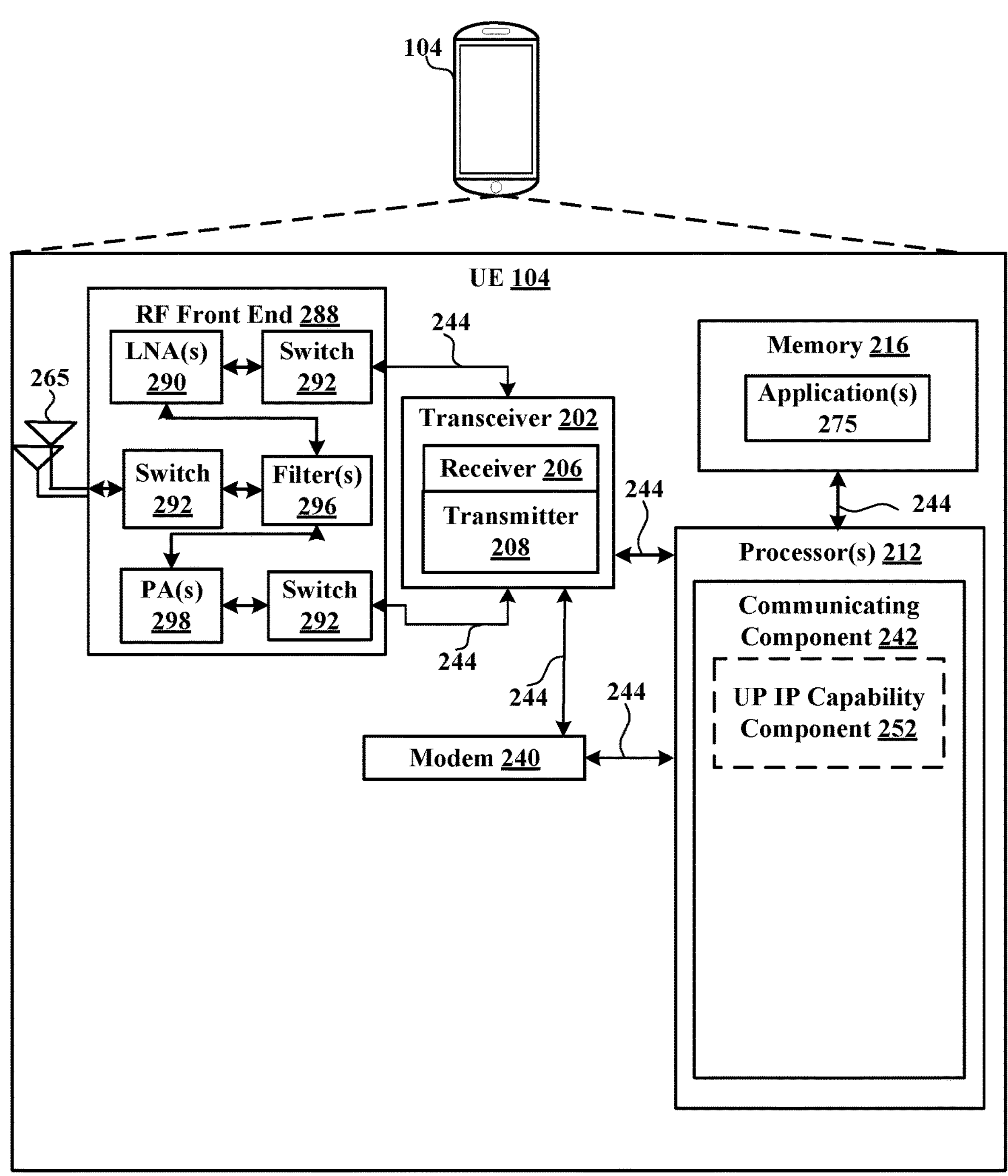
FIG. 2 is a block diagram illustrating an example of a UE, in accordance with various aspects of the present disclosure.
Figure 3:
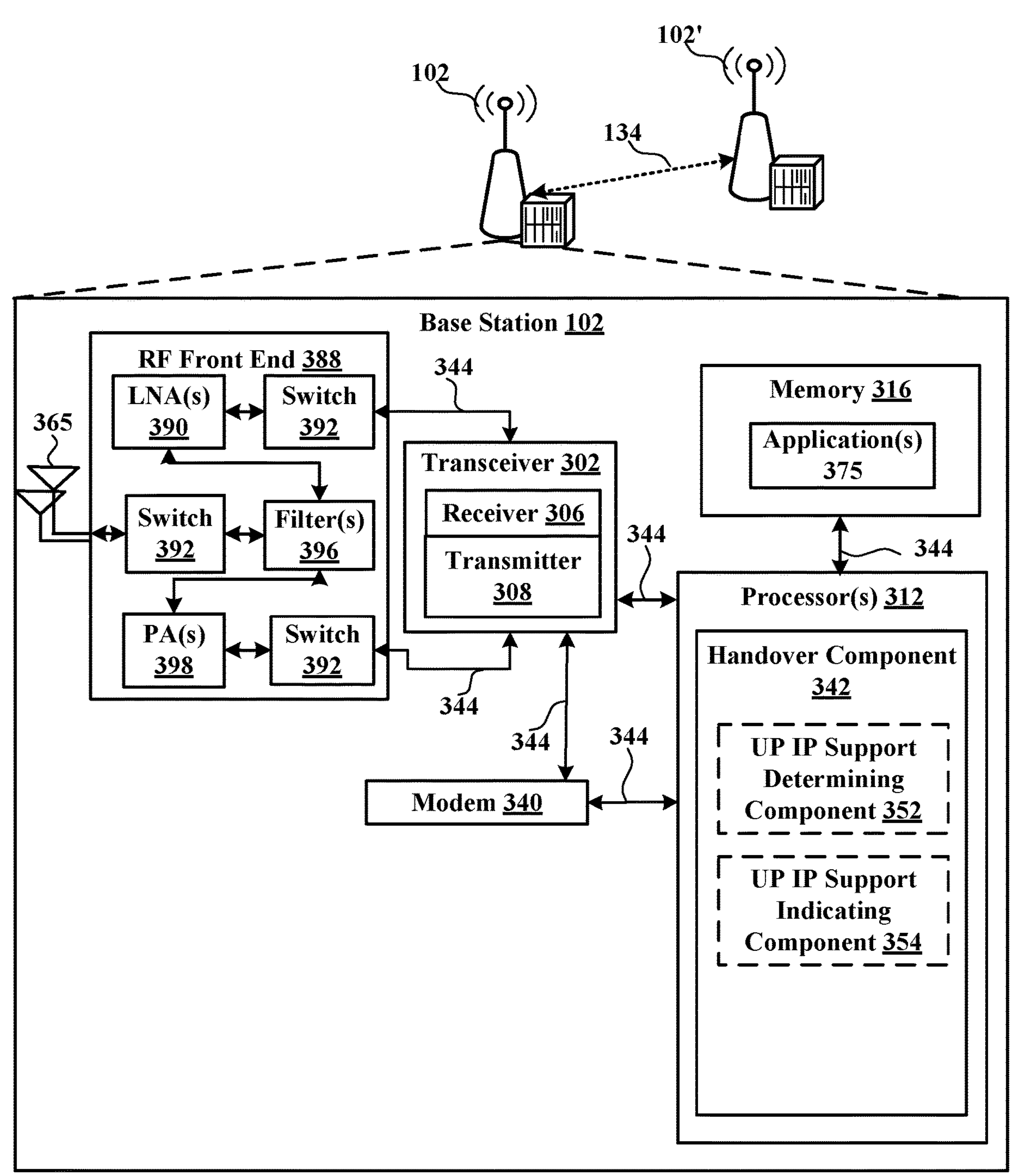
FIG. 3 is a block diagram illustrating an example of a base station, in accordance with various aspects of the present disclosure.
Figure 4:
FIG. 4 is a flow chart illustrating an example of a method for performing a handover of a UE to a target base station based on whether the target base station supports user plane (UP) integrity protection (IP), in accordance with various aspects of the present disclosure.
Figure 4:
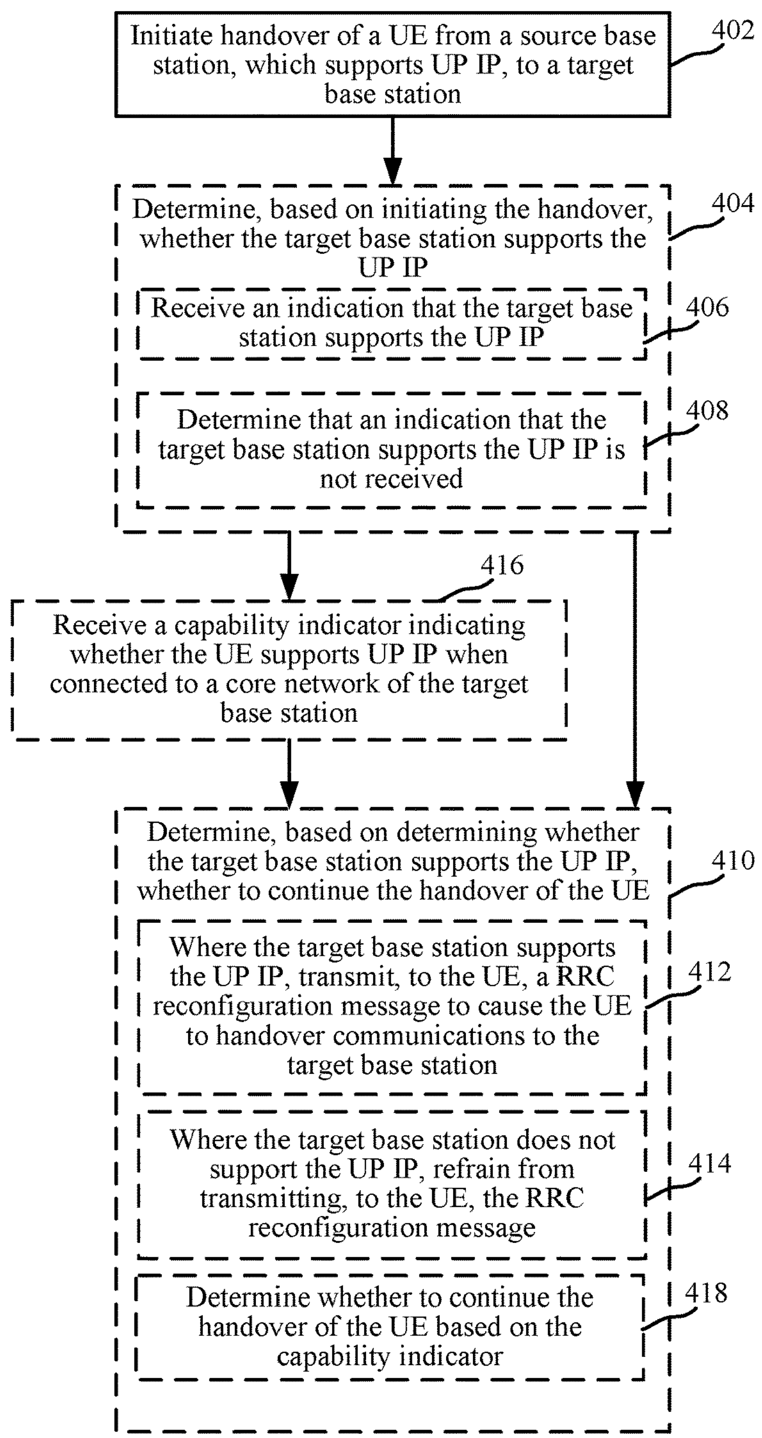
Figure 5:
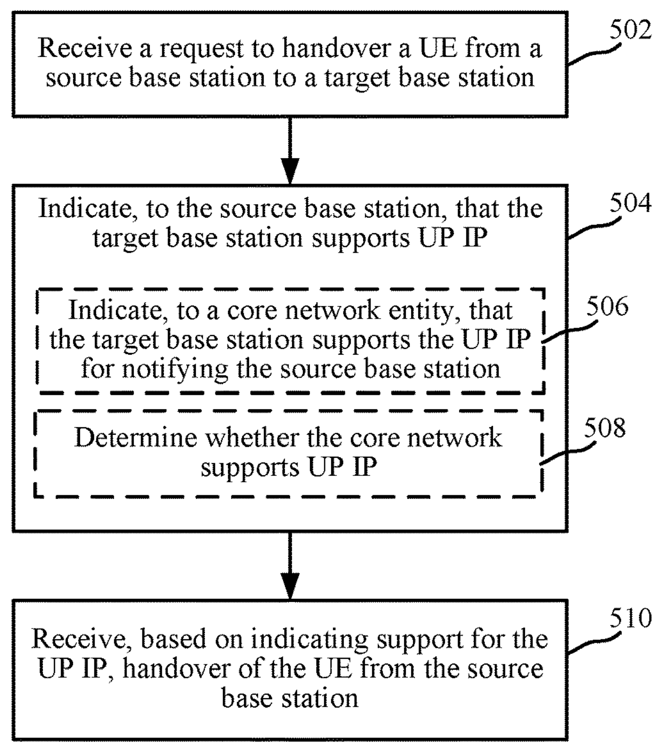
FIG. 5 is a flow chart illustrating an example of a method for indicating UP IP support, in accordance with various aspects of the present disclosure.
Figure 6:
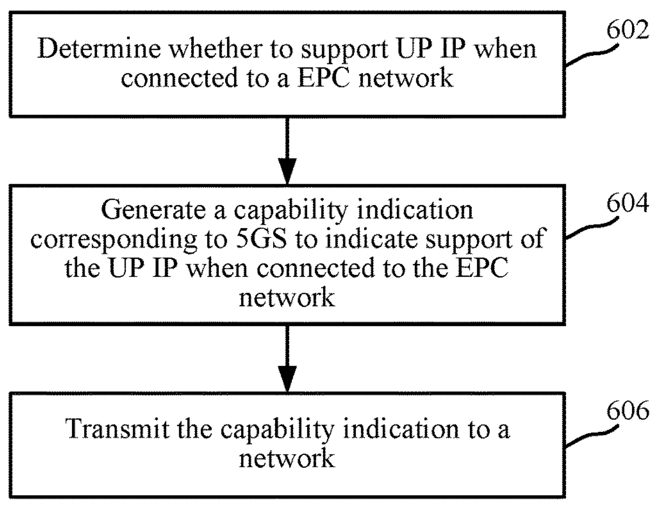
FIG. 6 is a flow chart illustrating an example of a method for indicating UP IP capability, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with one or more base stations 102 and/or gNBs 180 and/or core networks (e.g., EPC 160/5GC 190), in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a UP IP capability component 252 for indicating whether the UE 104 is capable of using UP IP, which may apply to certain RATs, types of core networks, etc., in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and handover component 342 for indicating UP IP support and/or for determining whether UP IP is supported for handing over a UE 104, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, handover component 342 can optionally include a UP IP support determining component 352 for determining whether a target base station supports UP IP for a UE 104 for handing over the UE 104 from base station 102 to the target base station, and/or a UP IP support indicating component 354 for indicating whether the base station 102 supports UP IP for a UE 104 for handing over the UE 104 from a source base station to the base station 102, in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for performing a handover of a UE to a target base station based on whether the target base station supports UP IP, in accordance with aspects described herein. In an example, a base station 102, functioning as a source base station in handover, can perform the functions described in method 400 using one or more of the components described in FIGS. 1 and 3. For example, referring to FIG. 3, base station 102 can be a source base station performing handover of a UE to base station 102', which can be a target base station, over a backhaul link 134.

In method 400, at Block 402, handover of a UE from a source base station, which supports UP IP, to a target base station can be initiated. In an aspect, handover component 342, e.g., in conjunction with processor(s) 312, memory 316, transceiver 302, etc., can initiate handover of the UE (e.g., UE 104) from the source base station (e.g., base station 102), which supports UP IP, to a target base station. For example, handover component 342 can determine to initiate handover of the UE 104 to the target base station based on a measurement report received from the UE 104 that includes a measurement of signals received from the target base station. In an example, handover component 342 can determine to initiate the handover based on comparing the signal measurement of the target base station to a signal measurement of the base station 102 reported by the UE 104, a signal measurement of other potential target base stations, etc. In addition, for example, handover component 342 can initiate handover of the UE by transmitting a request to handover to the target base station.

In method 400, optionally at Block 404, it can be determined, based on initiating the handover (or as part of the handover), whether the target base station supports the UP IP. In an aspect, UP IP support determining component 352, e.g., in conjunction with processor(s) 312, memory 316, transceiver 302, handover component 342, etc., can determine, based on initiating the handover, whether the target base station supports the UP IP. For example, UP IP support determining component 352 can determine whether the target base station supports the UP IP based on determining that UP IP is being used by the source base station 102 in communicating with the UE 104. For example, where UP IP is not being used, handover may not need to be conditioned on whether the target base station supports UP IP.

In determining whether the target base station supports the UP IP at Block 404, optionally at Block 406, an indication that the target base station supports the UP IP can be received. In an aspect, UP IP support determining component 352, e.g., in conjunction with processor(s) 312, memory 316, transceiver 302, handover component 342, etc., can receive the indication that the target base station supports the UP IP, and can determine the support based on this indication. As described further herein, UP IP support determining component 352 can receive the indication from the target base station or from a core network entity of a core network of the target base station, depending on the context of the RAT and/or core network of the source base station and the RAT and/or core network of the target base station. In addition, UP IP support determining component 352 can receive the indication in a transparent target to source container, in a handover message such as a handover request acknowledgement, etc., from the target base station or from a core network entity of a core network of the target base station, depending on the context of the RAT and/or core network of the source base station and the RAT and/or core network of the target base station. In any case, where UP IP support determining component 352 receives the indication, UP IP support determining component 352 can determine that the target base station supports the UP IP.

In determining whether the target base station supports the UP IP at Block 404, optionally at Block 408, it can be determined that an indication that the target base station supports the UP IP is not received. For example, absence of indication of support of UP IP by the target base station can indicate that the target base station is a legacy base station that does not support UP IP. In an aspect, UP IP support determining component 352, e.g., in conjunction with processor(s) 312, memory 316, transceiver 302, handover component 342, etc., can determine that the indication that the target base station supports the UP IP is not received. For example, UP IP support determining component 352 can determine that the indication is not received in a handover message (e.g., a handover request acknowledgement) or in a transparent target to source container before a handover message (e.g., a handover request acknowledgement) or within a certain time period of initiating the handover (e.g., within a certain time period of transmitting a handover message, such as a handover request, to the target base station), etc. Based on one or more of these conditions, UP IP support determining component 352 can determine that the target base station does not support the UP IP.

In one example, the source base station 102 can receive the indication of the target base station from a core network entity in an inter-system handover (e.g., where the source base station 102 communicates in a 5GS and the target base station communicates in an EPS). In another example, the source base station 102 can receive the indication of the target base station from the target base station in an intra-system handover (e.g., where the source base station 102 and target base station communicate in the same core network, which can be an EPS). In either instance, in another example, the source base station 102 can operate using a 5G NR RAT and/or the target base station can operate using a eUTRA RAT. Moreover, in an example, UP IP support determining component 352 can receive the indication for the target base station from an AMF associated with the source base station 102, which receives the indication from an MME associated with the target base station, where the target base station transmits the indication to its MME, as described herein.

In method 400, optionally at Block 410, it can be determined, based on determining whether the target base station supports the UP IP, whether to continue the handover. In an aspect, handover component 342, e.g., in conjunction with processor(s) 312, memory 316, transceiver 302, etc., can determine, based on determining whether the target base station supports the UP IP, whether to continue the handover. For example, where the target base station does not support the UP IP, handover component 342 can determine not to continue the handover, as doing so may result in undesired functionality, security violation, etc. for the UE 104. In one example, where handover component 342 determines to continue the handover, handover component 342 can transmit a RRC reconfiguration message to the UE 104 to cause the UE 104 to handover to the target base station. Where handover component 342 determines not to continue the handover, handover component 342 may refrain from sending a RRC reconfiguration message to the UE 104.

In an example, in determining whether to continue handover of the UE at Block 410, optionally at Block 412, where the target base station supports the UP IP, a RRC reconfiguration message can be transmitted to the UE to cause the UE to handover communications to the target base station. In an aspect, handover component 342, e.g., in conjunction with processor(s) 312, memory 316, transceiver 302, etc., can, where the target base station supports the UP IP, transmit, to the UE 104, the RRC reconfiguration message to cause the UE 104 to handover communications to the target base station, such to continue the handover for the UE. The UE 104 can accordingly complete the handover, and UP IP may remain intact. As described, the target base station supporting the UP IP can relate to whether the core network of the target base station supports UP IP, whether the RAT of the target base station supports UP IP, etc.

In an example, in determining whether to continue handover of the UE at Block 410, optionally at Block 414, where the target base station does not support the UP IP, it can be refrained from transmitting the RRC reconfiguration message to the UE. In an aspect, handover component 342, e.g., in conjunction with processor(s) 312, memory 316, transceiver 302, etc., can, where the target base station does not support the UP IP, refrain from transmitting, to the UE 104, the RRC reconfiguration message. Handover of the UE 104 to the target base station not supporting UP IP can be accordingly terminated.

In method 400, optionally at Block 416, a capability indicator indicating whether the UE supports UP IP when connected to a core network of the target base station can be received (e.g., from the core network entity). In an aspect, UP IP support determining component 352, e.g., in conjunction with processor(s) 312, memory 316, transceiver 302, handover component 342, etc., can receive (e.g., from the core network entity) the capability indicator indicating whether the UE supports UP IP when connected to a core network of the target base station. For example, UP IP support determining component 352 can receive the capability indicator in RRC signaling from the UE 104, which may include a 5G UE security capability IE, as described above, having at least one bit that indicates whether the UE support UP IP when connected to EPS.

In this example, in determining whether to continue handover of the UE at Block 410, optionally at Block 418, it can be determined whether to continue the handover of the UE based on the capability indicator. In an aspect, handover component 342, e.g., in conjunction with processor(s) 312, memory 316, transceiver 302, etc., can determine whether to continue the handover of the UE based on the capability indicator. For example, if the UE includes the capability indicator indicating that the UE supports UP IP for EPS (e.g., in the 5G UE security capability transmitted to the core network, which a core network entity can provide to the source base station 102), handover component 342 can determine to continue the handover where the target base station corresponds to a EPS. If the UE does not include the capability indicator or otherwise does not indicate such a capability, handover component 342 can determine to refrain from continuing the handover where the target base station corresponds to a EPS.

FIG. 5 illustrates a flow chart of an example of a method 500 for indicating that UP IP is supported, in accordance with aspects described herein. In an example, a base station 102, functioning as a target base station, can perform the functions described in method 500 using one or more of the components described in FIGS. 1 and 3.

In method 500, at Block 502, a request to handover a UE from a source base station to a target base station can be received. In an aspect, handover component 342, e.g., in conjunction with processor(s) 312, memory 316, transceiver 302, etc., can receive the request to handover the UE (e.g., UE 104) from the source base station to the target base station (e.g., base station 102). In some examples, handover component 342 can receive the request to handover the UE from the source base station (e.g., in a handover request), such as where the target base station and the source base station are part of the same core network or system (e.g., in an intra-system handover). In other examples, handover component 342 can receive the request to handover the UE from a core network entity (e.g., an MME), such as where the target base station and the source base station are part of different core networks or system (e.g., in an inter-system handover).

In method 500, at Block 504, it can be indicated, to the source base station, that the target base station supports UP IP. In an aspect, UP IP support indicating component 354, e.g., in conjunction with processor(s) 312, memory 316, transceiver 302, handover component 342, etc., can indicate, to the source base station, that the target base station (e.g., base station 102) supports UP IP. For example, UP IP support indicating component 354 can indicate the support for UP IP in a transparent target to source container, in a handover request acknowledgement, etc. In addition, for example, handover component 342 can indicate the support for UP IP by transmitting the message to the source base station as part of the handover procedure.

In another example, in indicating that the target base station supports UP IP at Block 504, optionally at Block 506, it can be indicated, to a core network entity, that the target base station supports the UP IP for notifying the source base station. In an aspect, UP IP support indicating component 354, e.g., in conjunction with processor(s) 312, memory 316, transceiver 302, handover component 342, etc., can indicate, to the core network entity, that the target base station supports the UP IP for notifying the source base station. For example, UP IP support indicating component 354 can indicate the support to an MME, which can forward the indication to the source base station via an AMF, as described above.

In another example, in indicating that the target base station supports UP IP at Block 504, optionally at Block 508, it can be determined whether the core network supports UP IP, and indicating that the target base station supports UP IP can be based on determining that the core network supports UP IP. In an aspect, UP IP support indicating component 354, e.g., in conjunction with processor(s) 312, memory 316, transceiver 302, handover component 342, etc., can determine whether the core network supports UP IP, and may indicate support for UP IP to the source base station based on this determination. For example, UP IP support indicating component 354 may receive an indication from the core network (e.g., from a core network entity) indicating UP IP support, and UP IP support indicating component 354 can determine to support UP IP (and indicate support for UP IP) based on the indication from the core network. In another example, UP IP support indicating component 354 can indicate the core network support for UP IP as a different indicator than that of the target base station (e.g., in the transparent target to source container).

In method 500, at Block 510, handover of the UE can be received from the source base station based on indicating support for the UP IP. In an aspect, handover component 342, e.g., in conjunction with processor(s) 312, memory 316, transceiver 302, etc., can receive, based on indicating support for the UP IP, handover of the UE from the source base station. As described, for example, the source base station can transmit a RRC reconfiguration message to the UE 104 based on determining UP IP support at target base station 102, and the UE 104 can accordingly transmit a RRC reconfiguration complete message to the target base station 102 to complete the handover.

FIG. 6 illustrates a flow chart of an example of a method 600 for indicating a capability for UP IP in certain configurations, in accordance with aspects described herein. In an example, a UE 104 can perform the functions described in method 600 using one or more of the components described in FIGS. 1 and 2.

In method 600, at Block 602, it can be determined whether to support UP IP when connected to a EPC network. In an aspect, UP IP capability component 252, e.g., in conjunction with processor(s) 212, memory 216, transceiver 202, communicating component 242, etc., can determine whether to support UP IP when connected to a EPC network. For example, UP IP capability component 252 can determine whether to support UP IP when connected to a EPC network based on whether it indicates support for UP IP when connected to the EPC network (e.g., in 5G UE security capability).

In method 600, at Block 604, a capability indication corresponding to 5GS can be generated to indicate support of the UP IP when connected to the EPC network. In an aspect, UP IP capability component 252, e.g., in conjunction with processor(s) 212, memory 216, transceiver 202, communicating component 242, etc., can generate the capability indication corresponding to 5GS to indicate support of the UP IP when connected to the EPC network. For example, a bit in 5G UE security capability IE, as described above, can be used to indicate support for UP IP when connected to EPS. For example, this IE can be available in gNB/ng-eNB, so more efficient decision on handover can occur by using this indication, as further described above in Block 412 of FIG. 4. In an example, a ng-eNB can be an eNB that can operate using eUTRA and can connect to a 5GC.

In method 600, at Block 606, the capability indication can be transmitted to a network. In an aspect, UP IP capability component 252, e.g., in conjunction with processor(s) 212, memory 216, transceiver 202, communicating component 242, etc., can transmit the capability indication to the network. For example, UP IP capability component 252 can transmit the capability indication in the 5G security capability IE (e.g., using RRC signaling and based on a request for capability information from the UE 104, as received by the source base station). For example, this capability can be signaled using NAS (i.e., to AMF) and used by both NAS (between UE and AMF) and AS (between UE and base station) security, etc.

Figure 7:
FIG. 7 illustrates examples of systems for indicating UP IP support for a target base station, in accordance with various aspects of the present disclosure.
Figure 7:
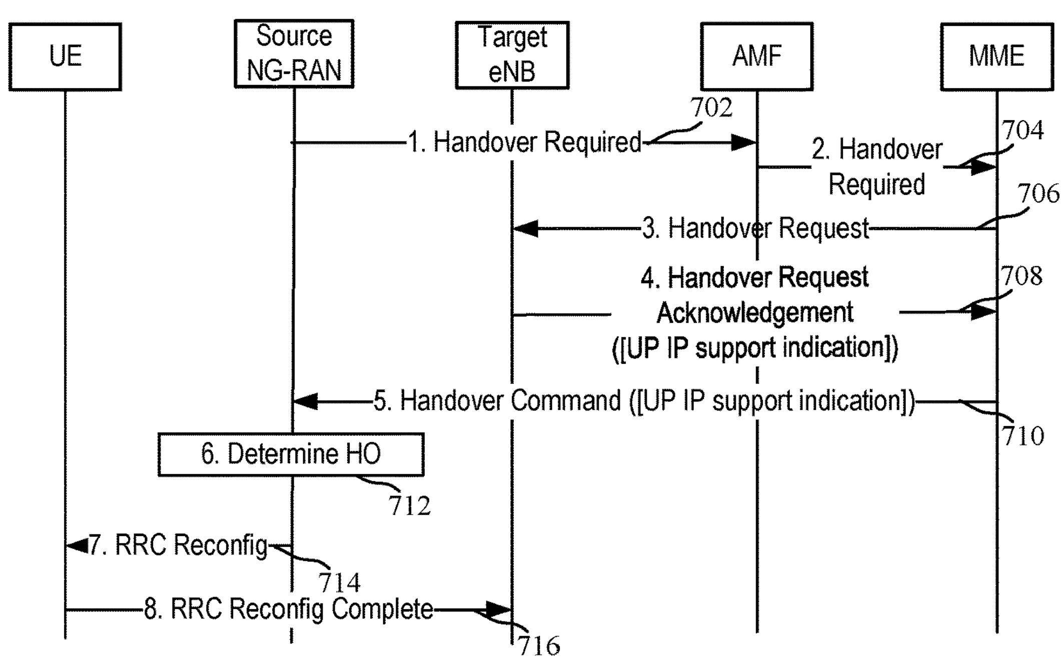
Figure 7:
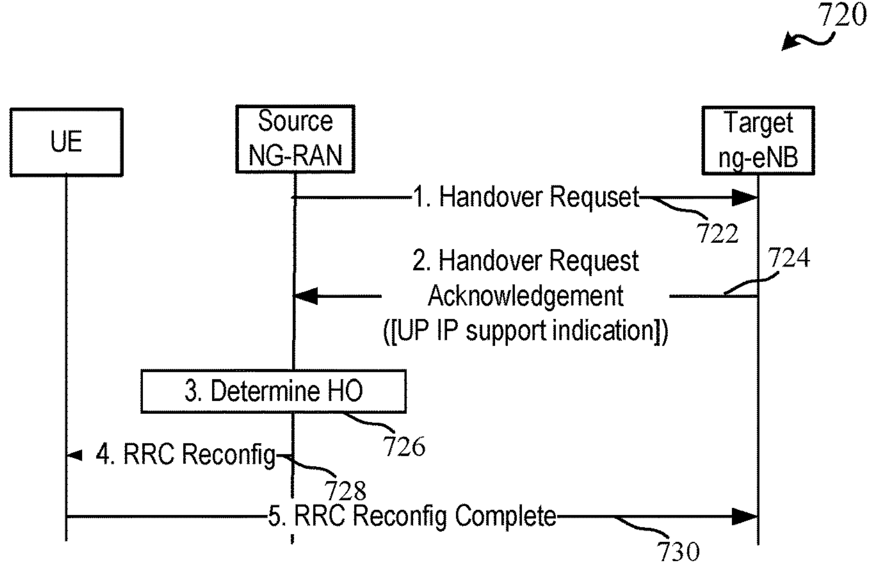

FIG. 7 illustrates examples of systems 700, 720 for indicating UP IP support for a target base station in handover, in accordance with aspects described herein. In system 700, a source NG-RAN node (e.g., a source base station) can transmit a handover required 702 to a core network entity (e.g., AMF) associated with the source NG-RAN node, which can send the handover required 704 to a core network entity (e.g., MME) associated with the target eNB. The MME can transmit the handover request 706 to the target eNB, and the target eNB can transmit a handover request acknowledgement 708 (or a transparent target to source container) to the MME, where the handover request acknowledgement 708 may include an indication that the target eNB supports UP IP. In another example, the target eNB may include, in the handover request acknowledgement 708, an indication of whether the core network of the target eNB supports UP IP. In this example, the MME can send a handover command 710 to the source NG-RAN (e.g., via communication with AMF) that includes the UP IP support indication from the target base station. The source NG-RAN can determine whether to continue handover of the UE 104 at 712, which may be based on the UP IP support indication. Where the source NG-RAN determines to handover at 712, it can send an RRC reconfiguration 714 to the UE to cause the UE to handover to the target base station, and the UE can send a RRC reconfiguration complete 716.

Thus, in this example of system 700 intersystem handover (e.g., NR to eUTRA) can be supported where the target eNB indicates its support of UP IP in handover command. If target eNB supports UP IP, it indicates UP IP support in Handover Request Acknowledgement (target eNB->MME->AMF). This message can include a target to source transparent container that contains RRC Reconfig and/or can include the container forwarded to the source gNB in Handover Command (AMF->gNB). Handover (HO) is performed at the source gNB. Without such indication, the source gNB may not be able to tell whether the target eNB is legacy or not. This can only be identified after UE being handed over to the target eNB (i.e., source has released the RRC connection). UP IP support at the target eNB can be indicated in target to source transparent container or HO request Ack and HO Command. If target eNB does not support UP IP (i.e., either legacy (Rel-16 or prior) eNB), handover command does not include the indication. The source gNB can determine that the target is a legacy eNB based on the absence of indication. The source gNB may cancel Handover procedure if the PDU sessions that require UP IP need to be transferred to the target. In an example, the target eNB can indicate support for UP IP based on determining whether its core network supports UP IP (e.g., based on receiving an indication from a core network entity that it supports UP IP).

In system 720, an intrasystem handover (e.g., NR to ng-eNB Xn) can be supported where the source NG-RAN node (e.g., source base station) and target ng-eNB can communicate directly within the same core network. In this example, source NG-RAN can send the handover request 722 to the target ng-eNB directly to handover UE to the target ng-eNB, and target ng-eNB can transmit handover request acknowledgement 724 to the source NG-RAN, which can include an indication of UP IP support. The source NG-RAN can determine whether to continue handover of the UE 104 at 726, which may be based on the UP IP support indication. Where the source NG-RAN determines to handover at 726, it can send an RRC reconfiguration 728 to the UE to cause the UE to handover to the target base station, and the UE can send a RRC reconfiguration complete 730.

In this example of system 720, if target eNB supports UP IP, it indicates UP IP support in Handover Request Acknowledgement (target ng-eNB->source gNB). This message can include a target to source transparent container that contains Handover Command, where Handover Command includes downlink (DL)-dedicated control channel (DCCH)-Message that contains RRC Reconfig. Handover is performed at the source gNB. Without such indication, the source gNB may not be able to tell whether the target ng-eNB is legacy or not. This can only be identified after UE being handed over to the target eNB (i.e., source has released the RRC connection). UP IP support at the target ng-eNB can be indicated in target to source transparent container or HO request Ack. If target eNB does not support UP IP (i.e., either legacy (Rel-16 or prior) ng-eNB), Handover command does not include the indication. The source gNB can determine that the target is a legacy eNB based on the absence of indication. The source gNB may cancel Handover procedure if the PDU sessions that require UP IP need to be transferred to the target.

The concepts described above can be provided in multiple scenarios of RATs and core networks. For example, Inter-core network HO procedure described above can apply to N2 HO (in 5GS): from ng-eNB (that supports UP IP), as source base station, to ng-eNB, as target base station. In another example, Inter-core network HO procedure described above can apply to Inter-system HO (from 5GS to EPS): ng-eNB (that supports UP IP) to eNB. Inter-core network HO procedure described above can apply to S1 HO (in EPS): from eNB (that support UP IP) to eNB, etc. In another example, Intra-core network HO procedure described above can be applicable to Xn HO (in 5GS): from ng-eNB (that supports UP IP) to ng-eNB. In another example, Intra-core network HO procedure described above can apply to X2 HO (in EPS): from eNB (that support UP IP) to eNB, etc.

In other examples, gNB/ng-eNB connected to 5GS may try to handover UE with bearers that require UP IP to EPS. If UE does not support UP IP when connected to EPS, handover may not be attempted as signaling may not result in successful handover. Thus, as described above, a bit of 5G UE security capability can be used to indicate that the UE supports UP IP when connected to EPS. This IE is available in gNB/ng-eNB so more efficient decision on handover can take place.

Figure 8:
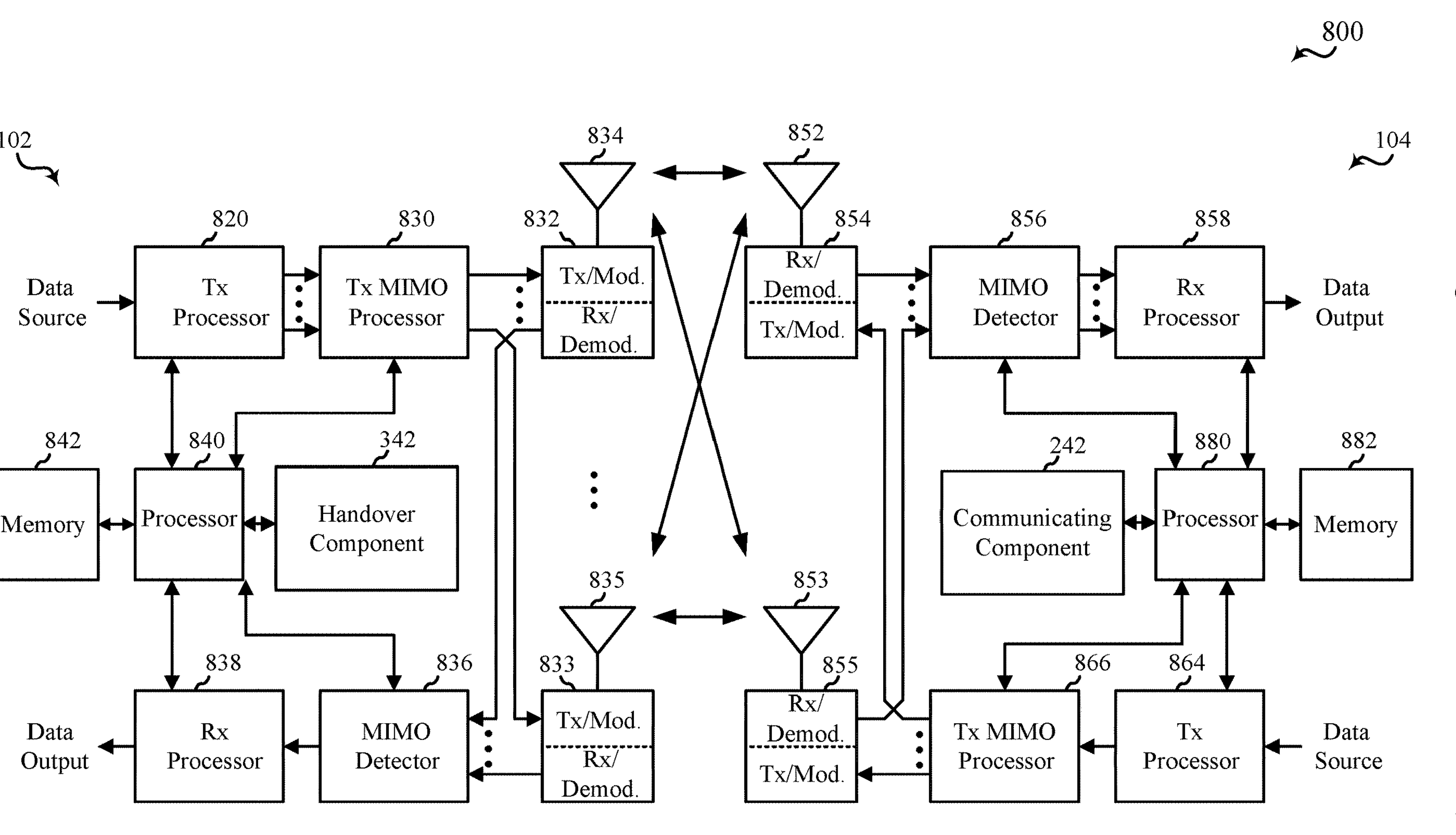
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a handover component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including initiating, by a source base station, handover of a UE from the source base station to a target base station, where the source base station supports UP IP for the UE, determining, based on initiating the handover, whether the target base station supports the UP IP, and determining, based on determining whether the target base station supports the UP IP, whether to continue the handover of the UE from the source base station to the target base station.

In Aspect 2, the method of Aspect 1 includes where determining whether the target base station supports the UP IP includes determining the target base station supports the UP IP based on receiving an indication that the target base station supports the UP IP.

In Aspect 3, the method of Aspect 2 includes where receiving the indication includes receiving the indication from a core network entity.

In Aspect 4, the method of Aspect 3 includes where receiving the indication includes receiving a handover command from the core network entity that includes the indication.

In Aspect 5, the method of any of Aspects 2 to 4 includes where receiving the indication includes receiving the indication from the target base station.

In Aspect 6, the method of Aspect 5 includes where receiving the indication includes receiving a handover request acknowledgement from the target base station that includes the indication.

In Aspect 7, the method of any of Aspects 1 to 6 includes where determining whether to continue the handover includes determining the continue the handover based on determining that the target base station supports the UP IP, and further comprising transmitting, to the UE, a radio resource control (RRC) reconfiguration message to cause the UE to handover communications to the target base station.

In Aspect 8, the method of any of Aspects 1 to 7 includes where the source base station corresponds to a first radio access technology (RAT) and the target base station corresponds to a second RAT.

In Aspect 9, the method of Aspect 8 includes where the first RAT is 5G NR and the second RAT is eUTRA.

In Aspect 10, the method of any of Aspects 1 to 9 includes where the source base station corresponds to a first core network, and the target base station corresponds to a second core network.

In Aspect 11, the method of Aspect 10 includes where the first core network is a 5GC network, and the second core network is an EPC network.

In Aspect 12, the method of any of Aspects 1 to 11 includes receiving, from the UE, a capability indicator indicating whether the UE supports UP IP when connected to a core network of the target base station, where determining whether to continue the handover of the UE from the source base station to the target base station is further based on the capability indicator.

In Aspect 13, the method of any of Aspects 1 to 12 includes where determining whether the target base station supports the UP IP includes determining the target base station does not support the UP IP based on determining that an indication that the target base station supports the UP IP is not received.

Aspect 14 is a method for wireless communication including receiving, by a target base station, an indication to handover a UE from a source base station to the target base station, indicating, to the source base station, that the target base station supports UP IP, and receiving, based on indicating support for the UP IP, handover of the UE from the source base station.

In Aspect 15, the method of Aspect 14 includes where indicating that the target base station supports the UP IP includes indicating, to a core network entity facilitating handover of the UE from the source base station, that the target base station supports the UP IP.

In Aspect 16, the method of any of Aspects 14 or 15 includes where indicating that the target base station supports the UP IP includes transmitting, to the source base station, a handover request acknowledgement that includes the indication.

In Aspect 17, the method of any of Aspects 14 to 16 includes receiving an indication that a core network entity of the target base station supports UP IP, where indicating, to the source base station, that the target base station supports UP IP is based on receiving the indication from the core network entity.

In Aspect 18, the method of any of Aspects 14 to 17 includes where the source base station corresponds to a first radio access technology (RAT) and the target base station corresponds to a second RAT.

In Aspect 19, the method of Aspect 18 includes where the first RAT is 5G NR and the second RAT is eUTRA.

In Aspect 20, the method of any of Aspects 14 to 19 includes where the source base station corresponds to a first core network, and the target base station corresponds to a second core network.

In Aspect 21, the method of Aspect 20 includes where the first core network is a 5GC network, and the second core network is an EPC network.

Aspect 22 is a method for wireless communication including determining whether to support UP IP when connected to an EPC network, generating a capability indication corresponding to a 5GS to indicate support of the UP IP when connected to the EPC network, and transmitting the capability indication to a network.

In Aspect 23, the method of Aspect 22 includes where the capability indication is in an unused bit of a security capability information element for a 5G NR RAT.

Aspect 24 is a method for wireless communication including initiating, by a source base station, handover of a UE from the source base station to a target base station, where the source base station supports UP IP for the UE, where the target base station supports the UP IP, transmitting, to the UE, a RRC reconfiguration message to cause the UE to handover communications to the target base station, and where the target base station does not support the UP IP, refraining from transmitting, to the UE, the RRC reconfiguration message to cause the UE to handover communications to the target base station.

In Aspect 25, the method of Aspect 24 includes receiving an indication that the target base station supports the UP IP.

In Aspect 26, the method of Aspect 25 includes where receiving the indication includes receiving the indication from a core network entity.

In Aspect 27, the method of Aspect 26 includes where receiving the indication includes receiving a handover command from the core network entity that includes the indication.

In Aspect 28, the method of Aspect 25 includes where receiving the indication includes receiving the indication from the target base station.

In Aspect 29, the method of Aspect 28 includes where receiving the indication includes receiving a handover request acknowledgement from the target base station that includes the indication.

In Aspect 30, the method of any of Aspects 24 to 29 includes where the source base station corresponds to a first RAT and the target base station corresponds to a second RAT.

In Aspect 31, the method of Aspect 30 includes where the first RAT is 5G NR and the second RAT is eUTRA.

In Aspect 32, the method of any of Aspects 24 to 31 includes where the source base station corresponds to a first core network, and the target base station corresponds to a second core network.

In Aspect 33, the method of Aspect 32 includes where the first core network is a 5GC network, and the second core network is an EPC network.

In Aspect 34, the method of any of Aspects 24 to 33 includes receiving, from the UE, a capability indicator indicating whether the UE supports UP IP when connected to a core network of the target base station, where transmitting, to the UE, the RRC reconfiguration message is further based on the capability indicator.

In Aspect 35, the method of any of Aspects 24 to 34 includes where refraining from transmitting, to the UE, the RRC reconfiguration message is based on determining that an indication that the target base station supports the UP IP is not received.

Aspect 36 is an apparatus for wireless communication including a transceiver, a memory configured to store instructions, and one or more processors communicatively coupled with the memory and the transceiver, where the one or more processors are configured to perform one or more of the methods of any of Aspects 1 to 35.

Aspect 37 is an apparatus for wireless communication including means for performing one or more of the methods of any of Aspects 1 to 35.

Aspect 38 is a computer-readable medium including code executable by one or more processors for wireless communications, the code including code for performing one or more of the methods of any of Aspects 1 to 35.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
- a transceiver;
- a memory configured to store instructions; and
- one or more processors communicatively coupled with the memory and the transceiver, wherein the one or more processors are configured to execute the instructions to cause the apparatus to:
  - initiate, by a source base station, handover of a user equipment (UE) from the source base station to a target base station by transmitting, to the target base station, a handover request, wherein the source base station supports user plane (UP) integrity protection (IP) for the UE;
  - receive, from the target base station, a handover message acknowledging the handover request to handover the UE from the source base station to the target base station;
  - determine, by the source base station, whether the handover message includes an indication to the source base station indicating that the target base station supports the UP IP;
  - transmit, if it is determined that the handover message includes the indication to the source base station indicating that the target base station supports the UP IP, a radio resource control (RRC) reconfiguration message to the UE to cause the UE to handover communications to the target base station; and
  - refrain from transmitting, if it is determined that the handover message does not include the indication to the source base station indicating that the target base station supports the UP IP and if one or more data sessions to be transferred to the target base station require UP IP support, the RRC reconfiguration message to the UE to cause cancelling handover of communications of the UE to the target base station.

2. The apparatus of claim 1, wherein the indication is from a core network entity.

3. The apparatus of claim 2, wherein the handover message is a handover command from the core network entity that includes the indication.

4. The apparatus of claim 1, wherein the handover message is a handover request acknowledgement from the target base station that includes the indication.

5. The apparatus of claim 1, wherein the source base station corresponds to a first radio access technology (RAT) and the target base station corresponds to a second RAT.

6. The apparatus of claim 5, wherein the first RAT is fifth generation (5G) new radio (NR) and the second RAT is Evolved Universal Mobile Telecommunications System (UMTS) Terrestrial Radio Access (eUTRA).

7. The apparatus of claim 1, wherein the source base station corresponds to a first core network, and the target base station corresponds to a second core network.

8. The apparatus of claim 7, wherein the first core network is a fifth generation core (5GC) network, and the second core network is an evolved packet core (EPC) network.

9. The apparatus of claim 1, wherein the one or more processors are further configured to execute the instructions to cause the apparatus to receive, from the UE, a capability indicator indicating whether the UE supports UP IP when connected to a core network of the target base station, wherein transmitting, to the UE, the RRC reconfiguration message is further based on the capability indicator.

10. The apparatus of claim 1, wherein the one or more processors are configured to execute the instructions to cause the apparatus to refrain from transmitting, to the UE, the RRC reconfiguration message based on determining that the indication that the target base station supports the UP IP is not received.

11. The apparatus of claim 1, wherein the handover message includes the indication in a transparent target to source container.

12. The apparatus of claim 1, wherein the handover message includes the RRC reconfiguration message.

13. A method for wireless communication, comprising:

initiating, by a source base station, handover of a user equipment (UE) from the source base station to a target base station by transmitting, to the target base station, a handover request, wherein the source base station supports user plane (UP) integrity protection (IP) for the UE;

receiving, from the target base station, a handover message acknowledging the handover request to handover the UE from the source base station to the target base station;

determining, by the source base station, whether the handover message includes an indication to the source base station indicating that the target base station supports the UP IP;

transmitting, when it is determined that the handover message includes the indication to the source base station indicating that the target base station supports the UP IP, a radio resource control (RRC) reconfiguration message to the UE to cause the UE to handover communications to the target base station; and refraining from transmitting, when it is determined that the handover message does not include the indication to the source base station indicating that the target base station supports the UP IP and when one or more data sessions to be transferred to the target base station require UP IP support, the RRC reconfiguration message to the UE to cause cancelling handover of communications of the UE to the target base station.

14. The method of claim 13, wherein the indication is from a core network entity.

15. The method of claim 14, wherein the handover message is a handover command from the core network entity that includes the indication.

16. The method of claim 13, wherein the handover message is a handover request acknowledgement from the target base station that includes the indication.

17. The method of claim 13, wherein the source base station corresponds to a first radio access technology (RAT) and the target base station corresponds to a second RAT.

18. The method of claim 13, wherein the source base station corresponds to a first core network, and the target base station corresponds to a second core network.

19. The method of claim 13, wherein the handover message includes the indication in a transparent target to source container.

20. The method of claim 13, wherein the handover message includes the RRC reconfiguration message.

21. The method of claim 17, wherein the first RAT is fifth generation (5G) new radio (NR) and the second RAT is Evolved Universal Mobile Telecommunications System (UMTS) Terrestrial Radio Access (eUTRA).

22. The method of claim 18, wherein the first core network is a fifth generation core (5GC) network, and the second core network is an evolved packet core (EPC) network.

23. The method of claim 13, further comprising receiving, from the UE, a capability indicator indicating whether the UE supports UP IP when connected to a core network of the target base station, wherein transmitting, to the UE, the RRC reconfiguration message is further based on the capability indicator.

24. The method of claim 13, wherein refraining from transmitting, to the UE, the RRC reconfiguration message is based on determining that the indication that the target base station supports the UP IP is not received.

* * * * *